Fig. 2

Patented Sept. 30, 1947

2,428,299

UNITED STATES PATENT OFFICE 2,428,299

FRICTION ELEMENTS BONDED WITH A REACTION PRODUCT OF POLYMERIZED LINSEED OIL, SULFUR AND PHENOL-ALDEHYDE RESIN MIXED WITH A BUTADIENE-ACRYLONITRILE COPOLYMER

Ray E. Spokes, Ann Arbor, and Emil C. Keller, Detroit, Mich., assignors to American Brake Shoe Company, Wilmington, Del., a corporation of Delaware Original application November 16, 1942, Serial No. 465,734. Divided and this application February 27, 1947, Serial No. 731,274

8 Claims. (Cl. 260—19)

This invention relates to friction elements and to making the same and more particularly, the present invention relates to friction elements of the type which are employed in the brakes of automotive vehicles, including trucks, buses, and passenger cars, as well as for clutch facings and the like.

This application is a division of our copending application, Serial No. 465,734, filed November 16, 1942, on "Friction elements."

Friction elements of the aforesaid character, as now made, are composed, in general, of friction material, such, for example, as asbestos, together with an organic binder and other organic or mineral friction-controlling or imparting agents, together with other materials which may be employed for imparting specific properties or characteristics to such friction elements, such, for example, as greater heat resistance, greater coefficient of friction, and the like.

Friction elements which are intended for heavy duty use upon heavy automotive trucks, buses and the like are commonly subjected to severe service conditions, that is to say, they are subjected in use to repeated and often prolonged braking operations which develop high temperatures in such friction elements, such temperatures frequently approaching 1000° F. on the friction surface of the friction elements, and progressively lower temperatures inwardly of the friction surfaces thereof. Such high temperatures, especially when occurring or repeated frequently, tend to depolymerize or otherwise decompose organic bonding materials, as well as other organic bonding materials which may be incorporated in friction elements, including finely divided granulated or so-called dispersed discrete particles of vulcanized natural soft scrap rubber, finely divided particles of cashew nut shell liquid polymer, or finely divided particles of heat polymerized drying oils, which have been employed in friction elements for the purpose of imparting desirable characteristics to such friction elements, including greater or more stable coefficient of friction, improved wear, and the like. Accordingly, there is a consequent tendency of such friction elements to exhibit loss of stability of friction characteristics due to heat decomposition or due to carbonization of the organic bonding and other agents therein and due to the resulting presence on the friction surface or within such friction elements of depolymerized and otherwise liquefied products of heat decomposition of such organic bonding and other materials. The loss of stability, as aforesaid, in friction elements containing finely divided dispersed and dust-like particles heretofore employed may result from the heat decomposition of such organic bonding and other agents and the consequent formation of a high percentage of benzol-extractable material, and accompanying formation of a glazed surface, or may be enhanced by carbonization of such organic bonding agents and other materials or by both of such causes. It may be said, however, that such loss of friction stability results largely from the baking on the friction surface of the products resulting from the heat decomposition of the organic bonding agent or agents and other materials employed in such friction elements.

Moreover, the glazed film thus formed on the friction surface of friction elements bonded with organic bonding agents, and which friction elements may contain finely divided and dispersed dust-like particles composed of the materials referred to hereinbefore, cannot readily be removed and is not self-removing since it decreases subsequent friction and heat formation so that a friction element with such a surface not only loses stability of friction characteristics but tends to retain the undesirable glazed film which causes this instability. Hence, it will be seen that a friction element so affected cannot recover desired frictional stability through normal use of the friction element. Moreover, this is also true when the organic bonding agents or the finely divided friction-controlling organic particles dispersed in such friction elements undergo carbonization due to the heat of friction incidental to the use of friction elements embodying such materials. These conditions are commonly known in the art as "fade" and "recovery."

Furthermore, the heat decomposition of organic bonding and friction-controlling agents in friction elements is attended by a softening thereof and results in loss of volatile matter which causes the structure of the friction element to become impaired. When the structure is so impaired, it has been observed that there is an increase in friction and that the friction element wears away at a comparatively rapid rate, which obviously is undesirable inasmuch as it materially shortens the life of the element.

Moreover, when the glazed condition, which is referred to hereinbefore, occurs, it is necessary to apply much greater braking forces than normally employed, and under such conditions, and with a softened bond or friction-controlling agent, greater shearing forces are exerted within the structure of the friction element, likewise resulting in rapid wear.

Hence, it will be seen that it is important and desirable that the bonding and friction-controlling agents employed in friction elements, and especially in heavy duty friction elements which are subjected to the severe service conditions and high temperatures referred to above, be able to withstand such severe usage and high temperatures without undergoing excessive heat decomposition or carbonization of such organic bonding or friction-controlling agents employed therein and resulting loss of stable friction characteristics under varying operating conditions.

Various attempts have heretofore been made to overcome the foregoing and other difficulties which have been experienced in the use of friction elements embodying organic bonding and friction-controlling agents and among such attempts have been the use of the various materials referred to above, namely, vulcanized soft scrap rubber, cashew nut shell liquid polymer, heat polymerized vegetable drying oils, and sulphurized oils, in the form of finely divided granules or so-called dispersed discrete particles, for controlling the friction characteristics of such friction elements or for preventing or inhibiting or compensating for decrease in the coefficient of friction in such friction elements, incidental to increasing temperatures, and so as to endeavor to maintain a substantially constant coefficient of friction under continuous service conditions.

While such finely divided friction controlling granules or so-called dispersed discrete particles, composed of the materials referred to hereinbefore, have, in certain instances, imparted desirable characteristics to friction elements in which such finely divided particles have been incorporated, we have found that such materials are not always or entirely satisfactory and have had objectionable properties and undesirable characteristics including those hereinafter indicated. Thus, for example, we have found that such finely divided particles undergo either substantial and excessive heat decomposition or disintegration and softening, or excessive carbonization, as a result of the high temperatures developed in the use of friction elements under severe service conditions and for prolonged periods of time, as will be referred to more specifically hereinafter, with consequent decrease in coefficient of friction and loss of other friction-controlling characteristics in friction elements employing such materials.

Moreover, the only way in which it is possible to control and vary the hardness and related properties and characteristics of finely divided particles of vulcanized soft scrap natural rubber, and the properties imparted thereby to friction elements in which such particles may be employed as a friction-controlling or friction-stabilizing ingredient, is by controlling the degree or extent to which such particles of soft scrap rubber are vulcanized. Further, the only way in which it is possible to control the hardness of finely divided particles of cashew nut shell liquid polymer, and the properties and characteristics imparted thereby to friction elements in which such particles may be employed as a friction-controlling or friction-stabilizing ingredient, is by the use of a resin of the phenolic-aldehyde type in conjunction with such finely divided particles of cashew nut shell liquid polymer particles to render said particles harder and more heat-resistant. However, as will be pointed out hereinafter, in the practice of the present invention the hardness and heat-resistance of the finely divided or dust-like friction-stabilizing particles may be easily and readily controlled and varied by employing in the making of said particles material having a selected and predetermined composition. Stated otherwise, in the practice of the present invention there is employed in making said finely divided friction-stabilizing particles a copolymer material, which will be referred to hereinafter, and the hardness and heat resistance and related properties of said finely divided or dust-like particles may be varied and controlled by employing in the making thereof a copolymer material which contains a selected and predetermined percentage of one component thereof inasmuch as the hardness and heat resistance and related properties of said finely divided or dust-like particles vary directly, that is, increase or decrease, in direct relationship to the percentage of said component in said copolymer material.

Other materials have also been employed in friction elements in an endeavor to control and stabilize the coefficient of friction and other friction characteristics thereof and to prevent decrease in coefficient of friction under varying and continuous service conditions, and such materials have included small amounts of harsh abrasive materials. However, such harsh abrasive materials have not been entirely satisfactory inasmuch as such harsh abrasive materials sometimes exert an undesirable scoring effect upon brake drums and the like with which friction elements are used. Moreover, there is a tendency for such abrasive particles to pulverize upon the surface of friction elements embodying the same with consequent undesirable increase in abrasiveness and greater tendency toward scoring of brake drums and the like with which such friction elements are used.

Accordingly, an object of the present invention is to afford a new and improved friction element, and method of making the same, which is substantially free from the foregoing and other disadvantages and objectionable features which have been experienced heretofore in the use of friction elements containing organic bonding agents and embodying finely divided dust-like particles or so-called dispersed discrete particles composed essentially of the various materials hereinbefore referred to and which have been employed heretofore as friction-controlling or friction-stabilizing agents.

A further object of the invention is to afford a new and improved friction element and method of making the same which imparts substantially uniform friction characteristics to such friction elements under continuous and varying and severe service conditions and prevents substantial loss of or decrease in the coefficient of friction therein, due to break-down of the bonding agent or friction-controlling agent employed therein by reason of the heat of friction incidental to the severe usage of such friction elements, thereby maintaining the coefficient of friction in such friction elements substantially constant, while, at the same time, being substantially free from or highly resistant to carbonization at the high temperatures to which such friction elements are subjected in use.

Another object of the present invention, ancillary to the foregoing objects, is to afford a new and improved friction element which is adapted for heavy duty use upon heavy trucks, buses and the like, as well as for use upon passenger cars and light trucks, particularly when they may be operated under severe conditions, and which embodies as a friction-controlling agent finely divided dust-like particles which resist heat decomposition and heat depolymerization and excessive softening and loss of friction stability resulting from such decomposition, and which are also highly resistant to carbonization at the high temperatures to which such friction elements are subjected in use.

An additional object of the present invention is to afford a new and improved friction element, and method of making the same, employing finely divided particles of a synthetic rubber-like elastoprene of the butadiene-acrylonitrile copolymer type as a friction-controlling or friction-stabilizing ingredient therein and in which the desired degree of hardness and heat resistance and related properties and characteristics which it may be desired to impart to said finely divided particles, and to a friction element containing said particles, may be readily controlled and varied by employing in the making of said finely divided particles a butadiene-acrylonitrile copolymer containing a selected and predetermined percentage of acrylonitrile as a component of the copolymer material.

A further object of the present invention, ancillary to the immediately preceding object, is to afford a new and improved friction element, and method of making the same, containing as a friction-controlling or friction-stabilizing ingredient finely divided particles of a synthetic rubber-like elastoprene of the butadiene-acrylonitrile copolymer type and which particles possess improved properties and characteristics as compared to finely divided particles of vulcanized soft scrap rubber including markedly superior heat resistance and the additional desirable advantage which resides in the fact that the degree of such increased or superior heat resistance possessed by the new friction-stabilizing particles may be predetermined and controlled and varied by employing in the making of said new friction-stabilizing particles a butadiene-acrylonitrile copolymer containing a selected and predetermined percentage of acrylonitrile, thus enabling friction elements containing said friction-stabilizing particles to be readily adapted or adjusted to particular and varying requirements and uses.

Other and further objects of the present invention will be apparent from the following description and claims and from the accompanying drawings.

We have found, among other things, that friction elements embodying as friction-controlling or friction-stabilizing agents finely divided dust-like materials or so-called dispersed discrete particles composed essentially of certain vulcanizable synthetic rubbery elastoprenes or so-called synthetic rubbers, which are referred to hereinafter, overcome or are substantially free from the foregoing and other difficulties and objectionable features which have been experienced heretofore in the use of friction elements embodying friction-controlling or friction-stabilizing materials in the form of finely divided dust-like particles or so-called dispersed discrete particles composed of the materials heretofore employed for this purpose, while at the same time being free from the aforesaid and other objectionable characteristics of harsh abrasive materials.

More specifically, we have ascertained that friction elements embodying as a friction-controlling or friction-stabilizing ingredient finely divided dust-like particles composed essentially of one or more vulcanizable synthetic rubber elastoprenes or so-called synthetic rubbers of the butadiene-acrylonitrile copolymer type, compounded with a relatively low sulphur content, are highly resistant to heat decomposition and heat depolymerization and carbonization even at the high temperatures to which heavy duty friction elements are subjected in use upon heavy duty trucks and buses and the like. Moreover, we have ascertained that friction elements embodying the finely divided dust-like materials which have been found useful and advantageous as friction-controlling agents in the practice of the present invention do not tend to form a relatively high percentage of benzol-extractable material upon being subjected to relatively high braking temperatures and hence do not tend to exhibit the consequent loss of friction stability which is exhibited by friction elements embodying the finely divided dust-like materials which have been employed heretofore as friction-controlling agents in friction elements, but retain substantially their original friction stability and other desirable characteristics.

Hence, it will be seen that the present invention is primarily concerned with friction elements containing as a friction-controlling ingredient finely divided particles or dust-like materials composed essentially of one or more vulcanizable synthetic vulcanized rubbery butadiene-acrylonitrile copolymer elastoprenes, compounded with a low sulphur content, and which may be subjected to severe service conditions without exhibiting objectionable heat decomposition or heat depolymerization and softening or carbonization resulting from or incidental to the high temperatures and severe service conditions to which friction elements are frequently subjected in use, and as may occur in the use of friction elements embodying as a friction-controlling ingredient therein the finely divided particles or dust-like materials heretofore employed for this purpose while being, at the same time, substantially free from the objectionable characteristics of the harsh finely divided abrasive materials which have been employed heretofore as friction-controlling ingredients in friction elements.

The class of finely divided particles or dust-like materials which may be employed as friction-controlling or friction-stabilizing agents in friction elements, in the practice of the present invention, is that class of vulcanizable synthetic rubbery elastoprenes or so-called synthetic rubbers which are essentially copolymers of the butadiene-acrylonitrile type and which are exemplified by, but not limited to, the disclosure of United States Letters Patent No. 1,973,000, granted September 11, 1934.

We have found that such materials have desirable properties as friction-controlling agents in friction elements in the practice of the present invention including resistance to heat decomposition and heat depolymerization and softening, as well as resistance to carbonization, under the high temperatures experienced in the severe usage of such friction elements, while still possessing a substantial degree or amount of resiliency and even after prolonged and severe usage and exposure to the high temperatures incidental thereto. Moreover, resiliency in such finely divided and dispersed particles is of particular significance in that it enables the finely divided particles which are employed as friction-controlling agents in friction elements to compensate for such loss of friction stability and decrease in coefficient of friction which might otherwise occur if it were not for the resiliency which is inherent in the finely divided or dust particles composed essentially of one or more synthetic vulcanizable rubbery elastoprenes of the butadiene-acrylonitrile copolymer type which are employed as friction controlling agents in friction elements in the practice of the present invention.

While a certain degree or amount of resiliency is inherent in the finely divided particles of soft scrap rubber, and in the finely divided particles of heat polymerized drying oils and, to a somewhat greater degree in the particles of cashew nut shell liquid polymer, which have been employed heretofore in friction elements as friction-controlling agents, such resiliency as is possessed by these materials is present therein only in the earlier stages of the use of such materials in friction elements and the resiliency of such materials is substantially lost or decreased either by heat decomposition or carbonization of such materials incidental to the use thereof as friction-controlling agents in friction elements, as referred to hereinbefore.

Other types of synthetic elastoprenes or so-called synthetic rubbers are, of course, known, and among these are those of the butadiene-styrene copolymer type which are exemplified by the disclosure of United States Letters Patent No. 1,938,731, granted December 12, 1933, and the non-vulcanizable chloro-butadiene or chloroprene type of polymers, which have been referred to above, and which are known as "Neoprene," "Duprene," and the like.

We have found, however, that finely divided or dust-like particles composed essentially of synthetic elastoprenes of the butadiene-styrene copolymer type, as well as those of the chloro-butadiene type, do not possess or impart to friction elements the desirable characteristics, including friction stability, and resistance to heat decomposition and carbonization, which are imparted to friction elements by finely divided particles composed essentially of synthetic elastoprenes of the butadiene-acrylonitrile copolymer type compounded with a relatively low sulphur content, as in the practice of the present invention. The present invention is, therefore, primarily concerned with friction elements embodying as friction-controlling or friction-stabilizing agents therein finely divided dust-like materials or so-called dispersed discrete particles composed essentially of vulcanizable synthetic rubber-like elastoprenes or so-called synthetic rubbers of the butadiene-acrylonitrile copolymer type, compounded with preferably from about five percent to about ten percent, by weight, of sulphur, and to which more specific reference will now be made.

The relationship of the monomer components and the general type of synthesis of the copolymer nuclei of the group of class of vulcanizable synthetic elastoprenes or so-called synthetic rubbers which are referred to above and which I have found to be useful as friction-controlling or friction-stabilizing agents in friction elements, in the practice of the present invention, may be illustrated as follows (J. I. E. C., vol. 34, No. 2, pp. 245–251, and News edition, Am. Chem. Soc., 19, 750 (1941), and revision, Chem. and Eng. News, vol. 20, No. 8, April 25, 1942, pp. 536, 537, 538):

Butadiene + acrylonitrile or vinyl cyanide ⟶

It will be understood in connection with the general type of synthesis or copolymerization illustrated above that certain of the materials which are employed in or are necessary in such syntheses, including the emulsifying, wetting, modifying and catalytic agents which are employed in the synthesis of the above mentioned butadiene-acrylonitrile copolymer type synthetic rubber-like elastoprenes, are trade secrets, although all of these materials are known to be essentially copolymers of the butadiene-acrylonitrile type.

All of the synthetic elastoprenes or so-called synthetic rubbers referred to above, and which are known to be useful as friction-controlling or friction-stabilizing materials, in the practice of the present invention, are currently available upon the market in commercial quantities, under the trade names referred to.

It will be seen, therefore, from the foregoing description, and from the disclosures referred to therein, that the present invention is primarily concerned with friction elements containing organic bonding agents and which friction elements contain as an ingredient thereof a friction-controlling agent in the form of dust-like materials or so-called finely divided dispersed discrete particles composed essentially of one or more vulcanizable synthetic rubber-like elastoprenes or so-called synthetic rubbers of the character obtained by copolymerization (under conditions and in the presence of other materials, such, for example, as those which are disclosed in Patent No. 1,973,000) of an unsaturated diolefinic or butadiene hydrocarbon of the type where $x$ represents either hydrogen or an alkyl group, and a compound (an acrylonitrile) of the type where R represents either hydrogen, as in acrylic acid nitrile, per se, or an alkyl group, as in methacrylic acid nitrile, to form a synthetic rubber-like high molecular weight elastoprene of the butadiene-acrylonitrile copolymer type, followed by compounding the product thus obtained with a relatively low percentage of sulphur and which is preferably not substantially less than five percent nor substantially more than ten percent, by weight, of the copolymer, and then finely dividing the sulphurized product thus obtained into relatively small particles or granules which may be dispersed with substantial uniformity throughout friction elements of the character herein contemplated.

A suitable formula which may be followed in making friction elements for normal heavy duty service, in the practice of the present invention, is the following, in which all parts indicated are by weight:

*Example No. 1*

| | Parts by weight |
|---|---|
| Heat polymerized vegetable drying oil (linseed) | 8.4 |
| Oil modified phenol-formaldehyde resin | 8.4 |
| Lead formate | 9.0 |
| Potassium dichromate | 1.0 |
| Vulcanized butadiene-acrylonitrile copolymer synthetic rubber-like elastoprene (finely divided dust-like particles, vulcanized with ten percent sulphur, by weight) | 4.0 |
| Pyrobituminous material (soft coal, finely divided) | 15.0 |
| Asbestos fiber | 65.0 |
| Sulphur | 2.5 |

A suitable formula which may be followed, in the practice of the present invention, in making friction elements which may be subjected to exceptionally severe heavy duty service, is the following, in which all parts indicated are by weight:

*Example No. 2*

| | Parts by weight |
|---|---|
| Crude (natural) rubber | 5.75 |
| Reclaimed rubber | 8.00 |
| Sulphur | 3.25 |
| Rubber accelerator (benzothiazyl disulphide) | 0.25 |
| Zinc oxide | 2.0 |
| Carbon black | 4.0 |
| Graphite | 7.0 |
| Lead sulphate | 15.0 |
| Blanc fixe | 7.5 |
| Phenol-formaldehyde resin | 12.0 |
| Vulcanized butadiene-acrylonitrile copolymer synthetic rubber-like elastoprene (finely divided dust-like particles, vulcanized with ten per cent sulphur, by weight) | 3.0 |
| Powdered lead | 8.0 |
| Brass chips | 10.0 |
| Asbestos fiber | 26.0 |

A suitable formula which may be followed, in the practice of the present invention, in making friction elements for use as brake linings upon passenger automobiles, light trucks, and the like, is the following, in which all parts indicated are by weight:

*Example No. 3*

| | Parts by weight |
|---|---|
| Crude (natural) rubber cement | 13.25 |
| Oil modified phenol-formaldehyde flexible resin | 12.0 |
| White lead | 7.5 |
| Pyrobituminous material (soft coal, finely divided) | 10.0 |
| Sulphur | 1.5 |
| Vulcanized butadiene-acrylonitrile copolymer synthetic rubber-like elastoprene (finely divided, dust-like particles, vulcanized with ten per cent sulphur, by weight) | 3.0 |
| Asbestos fiber | 65.0 |

The compositions illustrated in the foregoing Examples Nos. 1 and 2 may be converted into heavy duty type friction elements by intimately mixing the ingredients thereof and forming the resulting mixture into friction element shapes and then effecting the cure of the organic bonding agent, as by the application of heat alone, or by the application of both heat and pressure. Thus, in the manufacture of friction elements employing the composition which is illustrated in the foregoing Example No. 2, a temperature of from about 300° F. to about 325° F., and the application of a pressure of about two thousand pounds per square inch, for about four hours, are suitable, it being understood that the preferred or optimum temperature, pressure and application time stated above may be varied somewhat depending in part upon the particular composition and the specific temperature, pressure and application time employed. However, in the manufacture of friction elements employing either the composition which is illustrated in the foregoing Example No. 1, or the composition which is illustrated in the foregoing Example No. 3, the application of heat alone is sufficient to effect the cure of the bond and a typical example of suitable progressively increasing temperatures and application times which may be employed is as follows: Three hours at 225° F.; three hours at 275° F.; three hours at 300° F.; and three hours at 315° F.

As pointed out hereinbefore, the hardness and heat resistance and related properties and characteristics of the finely divided or dust-like particles of the butadiene-acrylonitrile copolymer friction-stabilizing material, which are referred to in the foregoing Examples Nos. 1 to 3, inclusive, may be readily varied and controlled by selecting and employing in the making of said finely divided friction-stabilizing particles, for a given sulphur content, a synthetic rubber-like elastoprene material of the butadiene-acrylonitrile copolymer type containing a predetermined or preselected percentage of acrylonitrile as a component of the copolymer material. Thus, the relative hardness and heat resistance of said finely divided or dust-like particles of friction-stabilizing material may be increased by employing in the making of said particles a butadiene-acrylonitrile copolymer containing a relatively high percentage of acrylonitrile as a component of the copolymer material as is true, for example, in the case of "Hycar OR" (5–15 or 25), "Chemigum" (X and I), and in certain of the materials known as "Stanco" and in the materials known as "Standard" and "Perbunan." On the other hand, if desired, the relative hardness and heat resistance of said finely divided particles of friction-stabilizing material may be decreased by employing in the making thereof a butadiene-acrylonitrile copolymer containing a relatively low percentage of acrylonitrile as a component of the copolymer material as in the case, for example, of "Hycar Ninene B," and in certain of the materials known as "Stanco."

It may be added, at this point, that the percentage of acrylonitrile in the various butadiene-acrylonitrile copolymer materials or elastoprenes referred to above, varies from a lower range of the order of approximately fifteen per cent, by weight, in the case of "Hycar Ninene B" and in certain of the materials known as "Stanco," to an upper range of the order of approximately fifty per cent, or slightly less, by weight, in the case of "Hycar OR" (5) and in certain of the materials known as "Stanco." It is to be understood, however, that the aforesaid ranges are merely illustrative and not critical and that butadiene-acrylonitrile copolymers containing a percentage of acrylonitrile below or above these ranges may be employed within the scope and contemplation of the present invention.

It will thus be seen that the hardness and heat resistance and related properties and characteristics of said finely divided or dust-like particles of friction-stabilizing material may be easily and readily controlled, in the practice of the present invention, and suited to the particular needs, requirements and uses of friction elements in which said finely divided or dust-like friction-stabilizing particles are to be employed.

It will be noted, in this connection, however, that strength is not an essential property or characteristic of the aforesaid finely divided or dust-like friction stabilizing particles and hence in making such particles a butadiene-acrylonitrile copolymer may be employed which contains a relatively low percentage of acrylonitrile. However, in those instances wherein the butadiene-acrylonitrile copolymer material is to be employed as a bonding agent in friction elements, strength is a highly desirable and important property and characteristic and hence for such purposes and uses a butadiene-acrylonitrile copolymer material is preferred which contains a relatively high percentage of acrylonitrile in the copolymer. In other words, in such instances, the hardness, heat resistance, and strength of the bonding agent may be easily and readily controlled and increased by selecting therefor a butadiene-acrylonitrile copolymer containing a relatively high percentage of acrylonitrile since, as pointed out hereinbefore, the hardness, heat resistance, and strength of such a bonding agent increase in direct relationship to the percentage of the acrylonitrile in the copolymer material. Moreover, this is true regardless of the particular brand of synthetic rubber-like elastoplastic of the butadiene-acrylonitrile copolymer type which may be employed and regardless of the particular catalytic and emulsifying and other agents which may be employed in the process of making the particular or selected butadiene-acrylonitrile copolymer material.

It may be desirable and advantageous, in certain instances, and for particular uses or purposes, to employ in making said finely divided or dust-like friction-stabilizing particles a mixture or mixtures of two or more butadiene-acrylonitrile copolymer materials of the character hereinbefore referred to so as to combine selected desirable characteristics thereof.

It will be noted, in this connection, that a typical and suitable manner of effecting substantially uniform distribution of the finely divided particles of the material found useful as a friction-controlling and friction-stabilizing agent throughout the resulting friction elements is to intimately mix said particles with the organic bonding agent prior to the time the organic bonding agent is intimately mixed with the friction material. However, the invention is not limited to this procedure and said finely divided particles may, if desired, be intimately mixed with the friction material and bonding agent after the friction material and bonding agent have been mixed together.

Figure 1:
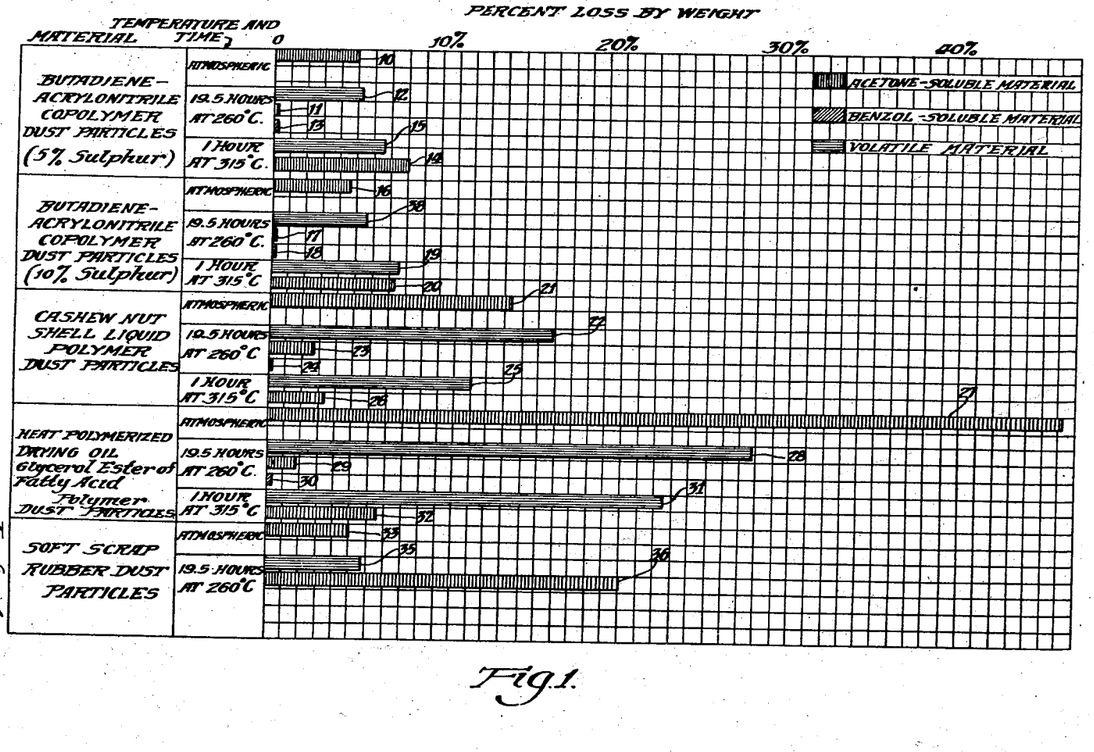
Figs. 1 and 2 are graphs illustrating certain properties or characteristics of finely divided particles composed of materials heretofore employed as friction-controlling ingredients in friction elements and illustrating comparable properties or characteristics of the friction-controlling materials which are employed in the practice of the present invention.
Figure 2:
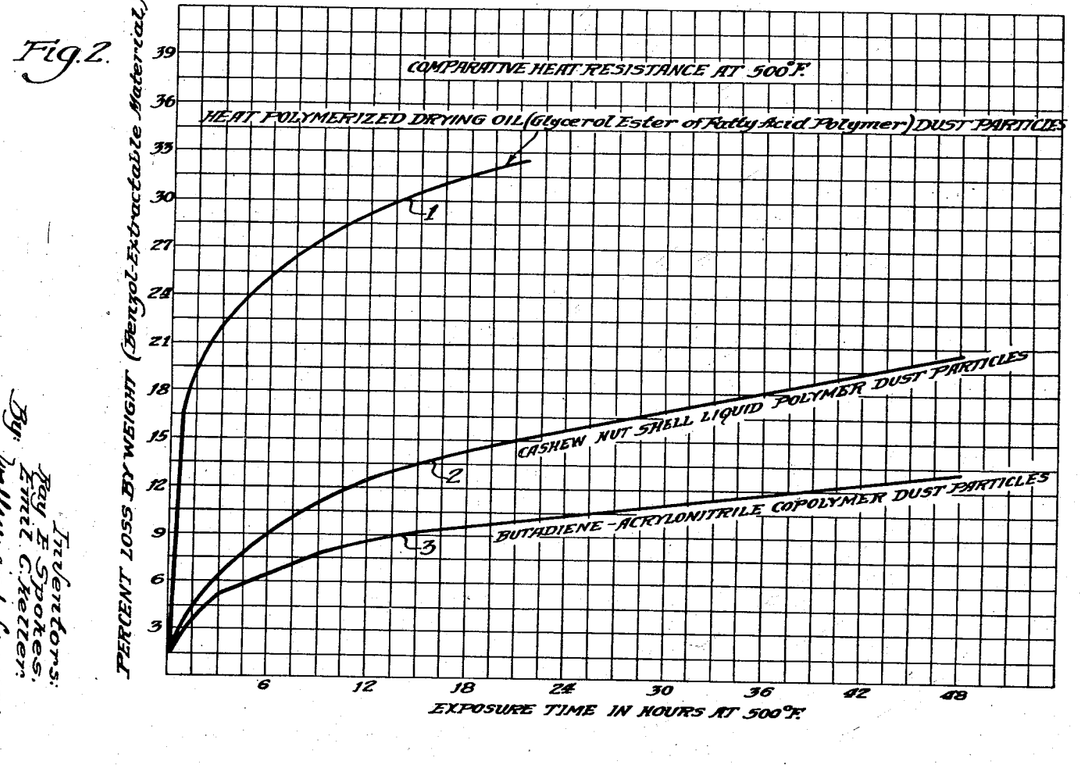

The graphs illustrated in Figs. 1 and 2 of the drawings show, among other things, the results of heat tests made upon materials heretofore employed in the form of dust-like materials or finely divided dispersed discrete particles as friction-controlling agents in friction elements, namely, finely divided particles composed assentially of cashew nut shell liquid polymer, finely divided particles composed essentially of a heat polymerized vegetable drying oil such, for example, as linseed, or finely divided particles composed of soft scrap rubber dust, as well as the results of corresponding heat tests made upon materials which have been found useful as friction-controlling agents in friction elements in the practice of the present invention, namely, finely divided or dust-like particles of vulcanizable synthetic rubber-like elastoprenes of the butadiene-acrylonitrile copolymer type.

The abscissae in Fig. 1 represent the loss in terms of per cent by weight of the specimens tested and the nature of the materials tested and the times and temperatures involved in the tests are shown at the left in Fig. 1.

In making the tests which are illustrated in the graphs shown in Figs. 1 and 2, synthetic vulcanized rubbery elastoprenes of the butadiene-acrylonitrile copolymer type ("Hycar Or" and "Perbunan") were compounded in one instance, with five per cent by weight of sulphur and in another instance with ten per cent by weight of sulphur, and the materials were sheeted, vulcanized by heat, chilled, cured and pulverized to a particle size of approximately 40 mesh. A one gram specimen of each of the finely divided or dust-like materials thus formed was then heated and tested under carefully controlled conditions including the controlled conditions of time and temperature which are shown in the graphs; comparable specimens composed essentially of cashew nut shell liquid polymer, heat polymerized drying oil (glycerol ester of fatty acid polymer known as "Neofat"), and finely divided particles composed of soft scrap rubber dust, all having the same particle size, were heated and tested under identical conditions, with the results indicated in the graphs which are illustrated in Figs. 1 and 2.

It may be added, at this point, that the heat polymerized drying oil employed in making certain of the specimens was the most stable and most completely heat polymerized drying oil currently available commercially, and is known by the trade name "Neofat," and is a product resulting from substantially complete heat polymerization of a glycerol ester of a fatty acid of animal origin so that the heat tests made show, among other things, the results of comparative heat resistance and other properties of finely divided particles of a relatively highly stable and completely polymerized drying oil and the corresponding properties of the materials which have been found useful as friction-controlling agents in friction elements in the practice of the present invention.

While, as pointed out above, the new finely divided or dust-like friction-controlling materials may be compounded with either five per cent or ten per cent, by weight, of sulphur, about ten per cent, by weight, of sulphur is preferred because approximately this percentage of sulphur assures sufficient hardness in the resulting vulcanized material to enable it to be granulated or formed into finely divided or dust-like particles while also assuring that such particles will possess sufficient resiliency to render them useful as friction-controlling agents or ingredients in friction elements in the practice of the present invention.

The graphs in Figs. 1 and 2 show, among other things, the percentage of acetone-soluble or unpolymerized monomer fraction or material present in the specimens prior to their being subjected to the heat tests; the loss in weight in terms of per cent in the specimens tested as measured by the percentage of acetone-soluble monomer or depolymerized material, and other acetone-soluble material resulting from the heat decomposition of the heat polymerized oils employed in preparing certain of the specimens, due to the heat tests made thereon; the loss in weight in terms of per cent in the specimens tested as measured by the percentage of benzol-soluble material formed in certain of the specimens and resulting from heat decomposition thereof during the heat tests; and the loss in weight in terms of per cent in the specimens tested as measured by the percentage of volatile materials given off by the specimens during and as a result of the heat tests.

It will be noted, in this connection, that the percentage of acetone-soluble material which was present in the specimens tested after they had been subjected to the heat tests, is a measure of the percentage of monomer fraction or heat depolymerized material, and other products of heat decomposition, in general, present in such specimens after they had been subjected to the heat tests. This test is also a measure of the percentage of the products of heat polymerization and heat decomposition, in general, formed in friction elements containing such materials when said friction elements are subjected to the temperatures to which such friction elements are subjected in use.

Similarly, the percentage of benzol-soluble material present in certain of the specimens, after they had been subjected to the heat tests, is a measure of the extent to which such specimens tested had undergone heat decomposition during and as a result of the heat tests, and this test is employed as a measure of the extent to which the friction-controlling materials referred to in certain of the graphs have undergone heat deterioration or decomposition.

The percentage of volatile material present in the specimens, after they had been subjected to the heat tests, is also a measure of the comparative stability of such materials when used as friction-controlling agents or ingredients in friction elements, and further indicates the extent or degree of heat decomposition of the materials tested.

As indicated at 10, in Fig. 1, a specimen of finely divided granules or particles composed essentially of butadiene-acrylonitrile copolymer synthetic vulcanized rubbery elastoprene, vulcanized with five per cent, by weight, of sulphur when tested at atmosphere temperature contained about 4.67 per cent acetone-soluble unpolymerized or monomer material. However, as may likewise be seen by reference to Fig. 1, and as therein indicated at 11, a specimen of finely divided particles or granules of butadiene-acrylonitrile copolymer synthetic vulcanized rubbery elastoprene, vulcanized with five per cent, by weight, of sulphur, after having been heated for 19.5 hours at a substantially constant temperature of 260° C., contained only about 0.28 per cent, by weight, of acetone-soluble or monomer material, thus indicating the marked stability of this material and its resistance to heat decomposition or heat depolymerization.

As indicated at 12 in Fig. 1, a specimen of finely divided particles of butadiene-acrylonitrile copolymer synthetic vulcanized rubbery elastoprene, vulcanized with five per cent, by weight, of sulphur, showed a loss of only about 5.26 per cent, by weight, as measured in terms of volatile material, after having been subjected to a substantially constant temperature of 260° C. for a period of 19.5 hours. Moreover, as indicated at 13 in Fig. 1, a specimen of this material showed a loss of only 0.21 per cent by weight, as measured in terms of benzol-soluble material, after having been subjected to a substantially constant temperature of 260° C. for 19.5 hours, thus indicating the high degree of resistance to heat decomposition possessed by this material.

As indicated at 14 in Fig. 1, a specimen of finely divided particles composed essentially of butadiene-acrylonitrile copolymer vulcanized with five per cent, by weight, of sulphur contained about eight per cent by weight, of acetone-soluble or monomer material, and a specimen of the same material showed a loss of about 6.5 per cent, by weight, as measured in terms of loss of volatile material, after having been subjected to a substantially constant temperature of 315° C. for a period of one hour, as indicated at 15 in Fig. 1.

As indicated at 16 in Fig. 1, a specimen of finely divided particles composed essentially of butadiene-acrylonitrile copolymer type synthetic vulcanized rubbery elastoprene, vulcanized with ten per cent, by weight, of sulphur, when tested at atmospheric temperature, contained about 4.58 per cent, by weight, of acetone-soluble or depolymerized material.

A specimen of finely divided particles composed essentially of butadiene-acrylonitrile copolymer compounded with ten per cent, by weight, of sulphur, showed a loss of about 5.60 per cent, by weight, as measured in terms of volatile material, after having been subjected to a substantially constant temperature of 260° C. for a period of 19.5 hours, as indicated at 38 in Fig. 1.

As indicated at 17 in Fig. 1, a similar specimen of this material after having been subjected to a substantially constant temperature of 260° C. for a period of 19.5 hours showed a loss by weight, as measured in terms of acetone-soluble material, of only about 0.27 per cent, thereby exhibiting the marked resistance to heat depolymerization possessed by this material.

A specimen of finely divided particles composed essentially of butadiene-acrylonitrile copolymer type synthetic vulcanized rubbery elastoprene, compounded or vulcanized with ten per cent, by weight, of sulphur, showed a loss in weight, as measured in terms of benzol-soluble material, of only 0.22 per cent, after having been subjected to a substantially constant temperature of 260° C. for a period of 19.5 hours, as indicated at 18 in Fig. 1.

As indicated at 19 in Fig. 1, a similar specimen of this material when subjected to a substantially constant temperature of 315° C. for a period of one hour, showed a loss of only about 7.6 per cent, by weight, as measured in terms of loss of volatile material, and, as indicated at 20 in Fig. 1, a similar specimen of the same material showed a loss of only about 7.4 per cent, by weight, as measured in terms of acetone-soluble material, when subjected to a substantially constant temperature of 315° C. for a period of one hour, thereby further demonstrating the marked resistance possessed by this material to heat deterioration and heat depolymerization, and its consequent desirable characteristics for use as a friction controlling ingredient in friction elements, in the practice of the present invention.

As may be seen by reference to Fig. 1, and as therein indicated at 21, a specimen of finely divided particles or granules composed essentially of cashew nut shell liquid polymer, when tested at atmospheric temperature, showed about 14.20 per cent, by weight, of acetone-soluble material, thereby exhibiting the presence in this material of a substantially greater amount or percentage of unpolymerized material or monomer fraction than is present in the finely divided particles composed essentially of butadiene-acrylonitrile copolymer type synthetic vulcanized rubbery elastoprene, compounded with either five per cent, by weight, of sulphur (see graph 10 in Fig. 1) or with ten per cent of sulphur (see graph 16 in Fig. 1).

As may also be seen by reference to Fig. 1, and as therein indicated at 2, a specimen of finely divided particles composed essentially of cashew nut shell liquid polymer, when heated for a period of 19.5 hours at a substantially constant temperature of 260° C., showed a loss in weight of 16.87 per cent, as measured in terms of loss of volatile material.

A specimen of finely divided particles composed essentially of cashew nut shell liquid polymer showed a loss of 2.72 percent, by weight, as measured in terms of acetone-soluble material, after having been exposed to a substantially constant temperature of 260° C. for a period of 19.5 hours, as indicated at 23 in Fig. 1, as compared to losses of only 0.28 and 0.27 percent, by weight, in the case of specimens of finely divided particles composed essentially of butadiene-acrylonitrile copolymer synthetic elastoprene compounded with five percent and ten percent, by weight, respectively, of sulphur (see graphs 11 and 17, respectively, in Fig. 1), when heat tested under identical conditions. This demonstrates the superior resistance to heat depolymerization and heat decomposition, in general, which is possessed by the materials found useful as friction-controlling ingredients in friction elements in the practice of the present invention compared to friction-controlling material composed essentially of finely divided particles of cashew nut shell liquid polymer.

As indicated at 24 in Fig. 1, a specimen of finely divided particles composed essentially of cashew nut shell liquid polymer showed a loss of 0.22 percent, by weight, as measured in terms of benzol-extractable material, after having been exposed to a substantially constant temperature of 260° C. for a period of 19.5 hours.

Graph 25 in Fig. 1 shows that a specimen of finely divided particles composed essentially of cashew nut shell liquid polymer, when heated for a period of one hour at a substantially constant temperature of 315° C., showed a loss of about twelve percent, by weight, as measured in terms of loss of volatile material and graph 26 in Fig. 1 shows that a specimen of the same material when subjected to the same conditions or heat test showed a loss of about 3.40 percent, by weight, as measured in terms of acetone-soluble material.

Graph 27 in Fig. 1 shows that a specimen of finely divided particles of a heat-polymerized drying oil (glycerol ester of fatty acid polymer known by and commercially available under the trade name "Neofat") when tested at atmospheric temperature contained 47.28 percent, by weight, of acetone-soluble material, thus indicating the relatively very high percentage of unpolymerized or acetone-extractable monomer fraction present in this material as compared to the relatively very low percentage of unpolymerized or acetone-soluble monomer fraction which is present, at atmospheric temperatures, in the materials which have been found useful as friction-controlling or friction-stabilizing agents in friction elements, in the practice of the present invention. This comparative relationship may be seen by comparing graphs 10 and 16 with graph 27 in Fig. 1.

Graph 28 in Fig. 1 shows that a specimen of finely divided particles composed essentially of a heat polymerized drying oil (the glycerol ester of fatty acid polymer which is referred to in the preceding paragraph) showed a loss in weight of 28.72 percent, as measured in terms of loss of volatile material, after having been subjected to a substantially constant temperature of 260° C. for a period of 19.5 hours, thus indicating the relatively poor or low resistance of this material to heat decomposition, as compared to the relatively high heat resistance possessed by the materials which have been found useful as friction-controlling or friction-stabilizing ingredients in friction elements, in the practice of the present invention. This comparative relationship may be seen by comparing graphs 12 and 38 with graph 28 in Fig. 1.

Graph 29 in Fig. 1 shows that a specimen of finely divided particles composed essentially of the heat polymerized drying oil which is referred to above in connection with graphs 27 and 28, showed a loss in weight of 1.76 percent, as measured in terms of acetone-extractable material, after having been subjected to a substantially constant temperature of 260° C. for a period of 19.5 hours. It will be noted, in this connection, however, that while this material exhibited a relatively small percentage of acetone-soluble depolymerized or monomer fraction, and other acetone-soluble products resulting from the heat decomposition of the oil employed in preparing this specimen, after having been subjected to the heat test described, its relatively low percentage of acetone-extractable material was due, not to any high degree of resistance of this material to heat-depolymerization and heat decomposition, in general, but to the fact that this material underwent a high degree of carbonization during this heat test. Moreover, the relatively poor resistance of this material to heat decomposition is shown by graph 28 in Fig. 1 which shows the relatively high percentage of volatile matter lost by this material after having been subjected to the heat test just described.

Graph 30 in Fig. 1 shows that a specimen of finely divided particles composed essentially of the heat polymerized drying oil, which has been referred to above in connection with graphs 28 and 29, showed a loss of only about 0.34 percent, by weight, as measured in terms of benzol-extractable material, after having been exposed to a substantially constant temperature of 260° C. for a period of 19.5 hours. However, the relatively low percentage of benzol-extractable material developed by this specimen in the heat test just described was not due to good or high resistance of this material to heat decomposition but was due to the fact that the specimen underwent a high degree of carbonization during the heat test. Moreover, the relatively poor resistance of this material to heat decomposition is shown by the relatively high degree of percentage of loss by weight, as measured in terms of loss of volatile material, shown by graph 28 in Fig. 1, and as described hereinbefore.

Graph 31 in Fig. 1 shows that a specimen of finely divided particles composed essentially of the heat polymerized drying oil, which has been referred to hereinbefore in combination with graphs 27, 28, 29 and 30, showed a loss by weight of about 23.5 per cent, as measured in terms of loss of volatile material, after having been subjected to a substantially constant temperature of 315° C. for a period of one hour, thereby indicating the relatively poor or low resistance of this material to heat decomposition at temperatures encountered by friction elements in use, and as compared to the relatively high heat resistance possessed by the materials found useful as friction-controlling or friction-stabilizing ingredients in friction elements, in the practice of the present invention. This comparative relationship may be seen by comparing graphs 15 and 19 with graph 31 in Fig. 1.

Graph 32 in Fig. 1 shows that a specimen of finely divided particles composed essentially of the heat polymerized drying oil, which has been referred to above in connection with graphs 27, 28, 29, 30 and 31, showed a loss by weight of approximately 6.5 per cent, as measured in terms of acetone-extractable material, after having been subjected to a substantially constant temperature of 315° C. for a period of one hour. It will again be noted, however, that the relatively low percentage of acetone-extractable material exhibited by this specimen, after the heat test just described, was not due to its resistance to heat-depolymerization or to heat decomposition, in general, but was due to a marked degree of carbonization of the specimen at the temperature involved in the test. Moreover, the relatively poor resistance of this material to heat decomposition, as shown by the relatively high percentage of loss by weight, as measured in terms of loss of volatile matter, exhibited by this material, compared to the materials employed as friction-controlling or friction-stabilizing ingredients in friction elements, in the practice of the present invention, has been pointed out hereinbefore in connection with graph 31 and may be seen by comparing graphs 15 and 19 with graph 31 in Fig. 1.

Graph 33 in Fig. 1 shows that a specimen composed essentially of finely divided particles of soft scrap rubber, vulcanized with a relatively low percentage of sulphur (from 2 to 6 per cent), contained approximately 4.91 per cent of unpolymerized or acetone-soluble monomer fraction when tested at atmospheric temperatures.

Graph 35 in Fig. 1 shows that a specimen of finely divided particles composed essentially of soft scrap rubber dust, vulcanized with a relatively low percentage of sulphur (from 2 to 6 per cent), showed a loss by weight of 5.76 per cent, as measured in terms of loss of volatile material, when subjected to a substantially constant temperature of 260° C. for a period of 19.5 hours.

Graph 36 in Fig. 1 shows that a specimen of finely divided particles composed essentially of soft scrap rubber dust, vulcanized with a relatively low percentage of sulphur (2 to 6 per cent), showed a less by weight of 21.0 per cent, as measured in terms of acetone-extractable material, when subjected to a substantially constant temperature of 260° C. for a period of 19.5 hours. The high percentage of acetone-extractable material exhibited by this specimen shows the poor or low resistance possessed by this material to heat-depolymerization and heat decomposition, in general, at temperatures encountered by friction elements in use, compared to the relatively high resistance to heat-depolymerization and heat decomposition, in general, which is possessed by the materials which have been found useful as friction-controlling or friction-stabilizing ingredients in friction elements, in the practice of the present invention. This comparative relationship may be seen by comparing graphs 11 and 17 with graph 36 in Fig. 1.

The specimens of finely divided particles composed essentially of soft scrap rubber dust, vulcanized with a relatively low percentage of sulphur (2 to 6 per cent), and the results of heat tests upon which are illustrated in graphs 35 and 36 in Fig. 1, all liquefied during these heat tests and when exposed to a substantially constant temperature of 260° C. for a period of 19.5 hours.

Hence, it was impossible to subject specimens of this material to heat tests at the higher temperature of 315° C., as was done in the case of the specimens composed of the other materials which are referred to in Fig. 1. This further indicates the poor or low heat resistance possessed by finely divided particles of soft scrap rubber, vulcanized with a relatively low percentage of sulphur, such as from 2 to 6 per cent, and the consequent unsuitability of this material for use as a friction-controlling or friction-stabilizing ingredient in friction elements, as evidenced by the fact that this material liquefies at temperatures which are frequently encountered in the use of such friction elements.

It is to be noted, in connection with the materials which have been found useful as friction-controlling and friction-stabilizing ingredients in friction elements, in the practice of the present invention, that the finely divided particles composed essentially of butadiene-acrylonitrile copolymer compounded with ten per cent, by weight, of sulphur, are somewhat harder than the same materials compounded with five per cent, by weight, of sulphur. Moreover, the variations or gradations in hardness of these materials correspond, in a general way, or are analogous to, the various gradations of hardness in finely divided particles composed essentially of cashew nut shell liquid polymer, and the hardness of which latter particles depends largely upon the degree of polymerization of the cashew nut shell liquid polymer of which such materials are composed. A significant difference, however, between the materials which have been found useful as friction-controlling or friction-stabilizing agents in friction elements, in the practice of the present invention and finely divided particles composed essentially of cashew nut shell liquid polymer resides in the fact that the softer forms of finely divided particles of cashew nut shell liquid polymer are substantially less resistant to heat-depolymerization and heat decomposition, in general, and give off substantially more volatile material than harder forms of finely divided particles composed essentially of cashew nut shell liquid polymer. It is to be noted, however, that a comparable or like situation does not exist in regard to the materials employed as friction-controlling or friction-stabilizing agents in friction elements in the practice of the present invention since the finely divided particles composed essentially of butadiene-acrylonitrile copolymer compounded with five per cent, by weight, of sulphur possess substantially the same degree or order of heat resistance that is possessed by finely divided particles of the same material compounded with ten per cent, by weight, of sulphur. However, since, as pointed out elsewhere herein, the particles of this material compounded with ten per cent, by weight, of sulphur are somewhat harder and hence easier to break up into the desired particle size, the material compounded with ten per cent, by weight, of sulphur is preferred.

It is desirable that finely divided particles of friction-controlling or friction-stabilizing materials, in friction elements, be at least as heat-resistant as the organic bonding agents which are employed in such friction elements. It is preferred, however, that such finely divided particles of friction-controlling and friction-stabilizing materials preferably have substantially greater resistance to heat depolymerization and heat decomposition, in general, than is possessed by the organic bonding agents which are employed in friction elements and in which such finely divided particles of friction-controlling or friction-stabilizing materials may be dispersed.

It is significant to note, however, and we have so ascertained, that finely divided particles composed essentially of soft scrap rubber, vulcanized with a low percentage of sulphur, such as from 2 to 6 per cent, not only possess relatively poor or low resistance to heat depolymerization and heat decomposition, in general, at temperatures to which friction elements are commonly subjected in use, but such finely divided particles of soft rubber scrap are, in fact, substantially less resistant to heat depolymerization and heat decomposition, in general, at such temperatures than are the organic bonding agents which are commonly employed in friction elements and such, for example, as an oil modified phenol resin, or natural hard rubber vulcanized with a high percentage of sulphur and protected by means of a phenol resin. Moreover, as shown in the graphs illustrated in Figs. 1 and 2, the heat resistance of such finely divided particles of soft scrap rubber, vulcanized with a low percentage of sulphur, is not substantially superior to the heat resistance of finely divided particles of polymerized drying oils which, in turn, are substantially inferior in heat resistance to finely divided particles of the materials which have been found useful as friction-controlling and friction-stabilizing materials in friction elements in the practice of the present invention.

Fig. 2 is a graph illustrating the results of tests made upon specimens of certain of the friction-controlling materials which were employed in making the heat tests, the results of which are shown in Fig. 1, namely, a specimen of finely divided particles composed essentially of heat polymerized drying oil (glycerol ester of fatty acid polymer) (graph 1 in Fig. 2); a specimen of finely divided particles composed essentially of cashew nut shell liquid polymer (graph 2 in Fig. 2); and a specimen of finely divided particles of the material which has been found useful as a friction-controlling ingredient in friction element in the practice of the present invention, namely, butadiene-acrylonitrile copolymer type synthetic vulcanized rubbery elastoprenes, compounded with ten per cent by weight of sulphur.

The abscissae in Fig. 2 represent the number of hours at which the specimens were subjected to heat tests at a substantially constant temperature of 500° F., and the ordinates represent the per cent loss by weight of the specimens as measured in terms of benzol-extractable material.

As shown in Fig. 2, the specimen of finely divided particles composed essentially of heat polymerized drying oil (glycerol ester of fatty acid polymer) showed a substantial percentage of loss by weight, as measured in terms of benzol-extractable material, namely, approximately 18 per cent, when heated for only a relatively short period of between 1 and 2 hours at a substantially constant temperature of 500° F. As shown by graph 1 in Fig. 2 this specimen showed a further increase in loss of weight, up to about 33 per cent, as measured in terms of benzol-extractable material, during the remainder of the heat test, thereby indicating its poor resistance to heat decomposition at temperatures to which friction elements are frequently subjected in use.

Graph 2 in Fig. 2 shows that a specimen of finely divided particles composed essentially of cashew nut shell liquid polymer also exhibited substantially greater loss by weight, as measured in terms of loss of benzol-extractable material, than was exhibited by the specimen of finely divided particles of material found useful as a friction-controlling and stabilizing agent in friction elements in the practice of the present invention, namely, finely divided particles composed essentially of butadiene-acrylonitrile copolymer type synthetic vulcanized rubbery elastoprenes, componded with about ten per cent, by weight, of rubber, as may be seen by comparing graphs 1 and 2 with graph 3 in Fig. 2.

It will thus be seen from the foregoing description, considered in conjunction with the graphs which are shown in Figs. 1 and 2, that finely divided particles of material found useful as a friction-controlling and friction-stabilizing agent in friction elements, in the practice of the present invention, namely, finely divided particles composed essentially of butadiene-acrylonitrile copolymer type synthetic vulcanized rubbery elastoprene, compounded with preferably not in excess of about ten per cent, by weight, of sulphur, possess substantially greater resistance to heat depolymerization, and to heat decomposition, in general, than is possessed by finely divided particles of the materials heretofore employed as friction-controlling and friction-stabilizing agents in friction elements, and which have been referred to hereinbefore.

It will be seen, therefore, from the foregoing description, considered in conjunction with the accompanying drawings, that the present invention affords a new and improved friction element, and a new and substantially superior friction-controlling and friction-stabilizing agent for friction elements. It will also thus be seen that friction elements containing the material found useful as a friction-controlling agent in the practice of the present invention have the desirable properties and characteristics, which have hereinbefore been pointed out, as well as others which are inherent in the invention, and including greater friction stability, greater resistance to heat depolymerization, and to heat decomposition, in general, and to softening, and greater resiliency, at temperatures to which friction elements are subjected in use, than is possessed by the materials heretofore employed as friction-controlling agents in friction elements.

It will thus be seen that friction elements made according to the practice of the present invention possess the desirable characteristics hereinbefore mentioned, as well as others which are inherent In the invention, and that the invention thus accomplishes its intended objects including those hereinbefore specifically set forth, as well as others which are inherent in the invention and in the practice thereof.

It will likewise be seen, from the foregoing description, considered in conjunction with the accompanying drawings, that the present invention affords a new and improved method of making friction elements and that said method results in friction elements or products having the advantages and desirable characteristics hereinbefore set forth and others inherent therein.

While we have illustrated and described selected embodiments of our invention, and of the new friction elements made in the practice thereof, it is to be understood that these are capable of variation and modification and we do not, therefore, wish to be limited to the precise details of the friction elements, composition and method which are set forth but desire to avail ourselves of such changes and modifications as come within the purview of the following claims.

We claim:

1. A friction element for use upon vehicular brakes, and upon clutches, comprised of a mass of friction material, inert filler, and a friction-modifying agent, bonded with the heat-reaction product of a mixture of a sulphurizable heat-polymerized linseed oil, together with a heat-resistant phenol-aldehyde resin, and sulphur, the said sulphurizable heat-polymerized linseed oil and the said heat-resistant phenol-aldehyde resin and the said sulphur being employed as components of the said bond in the ratios relative to each other of 8.4 parts of heat-polymerized linseed oil to 8.4 parts of heat-resistant phenol-aldehyde resin and 2.5 parts of sulphur, all of said parts being by weight; the said bond having dispersed therethrough finely divided, dust-like, resilient, friction-stabilizing particles of a copolymer of a member of the group consisting of butadiene 1,3 and 2 methyl butadiene 1,3 and a member of the group consisting of acrylic acid nitrile and methacrylic acid nitrile, the said finely divided dust-like resilient, friction-stabilizing particles being employed as a component of the said bond in a partially vulcanized condition as compounded with not less than five per cent nor more than ten per cent of the unvulcanized copolymer, by weight, of sulphur, the said finely divided, dust-like, resilient, friction-stabilizing particles being employed as a component of the said bond in the amount of 17.2 per cent of the said bond, by weight, and the said friction element being characterized by friction stability and high resistance of the said finely divided, dust-like, resilient, friction-stabilizing particles to heat-depolymerization and resulting heat-decomposition when the said friction element is subjected to elevated temperatures in use.

2. A friction element as defined in claim 1 in which the said heat-resistant phenol-aldehyde resin is a heat-resistant phenol-formaldehyde resin.

3. A friction element as defined in claim 1 in which the said heat-resistant phenol-aldehyde resin is a heat-resistant oil-modified phenol-formaldehyde resin.

4. A friction element as defined in claim 1 in which the hydrocarbon component of the said copolymer of which the said finely divided, dust-like, resilient, friction-stabilizing particles are formed is 1,3 butadiene.

5. A friction element as defined in claim 1 in which the hydrocarbon component of the said copolymer of which the said finely divided, dust-like, resilient, friction-stabilizing particles are formed is 2-methyl 1,3 butadiene.

6. A friction element as defined in claim 1 in which the acrylonitrile component of the unvulcanized butadiene 1,3 acrylonitrile copolymer of which the said finely divided, dust-like, resilient, friction-stabilizing particles are formed is acrylic acid nitrile.

7. A friction element as defined in claim 1 in which the acrylonitrile component of the unvulcanized butadiene 1,3 acrylonitrile copolymer of which the said finely divided, dust-like, resilient, friction-stabilizing particles are formed is methacrylic acid nitrile.

8. A friction element as defined in claim 1 in which the acrylonitrile component of the said butadiene 1,3 acrylonitrile of which the said finely divided, dust-like, resilient, friction-stabilizing particles are formed constitutes not less than fifteen per cent nor more than fifty per cent of the said unvulcanized butadiene 1,3 acrylonitrile copolymer, by weight.

RAY E. SPOKES.
EMIL C. KELLER.